United States Patent
Jeong

(10) Patent No.: US 12,394,307 B2
(45) Date of Patent: Aug. 19, 2025

(54) SPEED PREDICTION DEVICE AND METHOD THEREOF

(71) Applicant: HYUNDAI AUTOEVER CORP., Seoul (KR)

(72) Inventor: Da Un Jeong, Seongnam-si (KR)

(73) Assignee: HYUNDAI AUTOEVER CORP., Seoul (KR)

( * ) Notice: Subject to any disclaimer, the term of this patent is extended or adjusted under 35 U.S.C. 154(b) by 178 days.

(21) Appl. No.: 18/076,924

(22) Filed: Dec. 7, 2022

(65) Prior Publication Data
US 2023/0186764 A1 Jun. 15, 2023

(30) Foreign Application Priority Data
Dec. 9, 2021 (KR) .......................... 10-2021-0175269

(51) Int. Cl.
G08G 1/052 (2006.01)
G01P 11/02 (2006.01)

(52) U.S. Cl.
CPC .............. *G08G 1/052* (2013.01); *G01P 11/02* (2013.01)

(58) Field of Classification Search
CPC ................................ G08G 1/052; G01P 11/02
See application file for complete search history.

(56) References Cited

U.S. PATENT DOCUMENTS

| | | | |
|---|---|---|---|
| 8,255,145 B2 | 8/2012 | Murata et al. | |
| 2010/0049428 A1* | 2/2010 | Murata | G09B 29/007 701/533 |
| 2017/0243121 A1* | 8/2017 | Lai | G08G 1/0129 |

FOREIGN PATENT DOCUMENTS

| | | |
|---|---|---|
| JP | 4185956 B2 | 11/2008 |
| JP | 2012026751 A | 2/2012 |
| KR | 20020017535 A | 3/2002 |
| KR | 20200040501 A | 4/2020 |
| KR | 20210074531 A | 6/2021 |

OTHER PUBLICATIONS

Office Action cited in corresponding Korean patent application No. 10-2021-0175269; Mar. 25, 2024; 9 pp.
Office Action cited in corresponding Korean patent application No. 10-2021-0175269; Nov. 25, 2024; 8 pp.

* cited by examiner

*Primary Examiner* — Andrew J Cromer
(74) *Attorney, Agent, or Firm* — Lempia Summerfield Katz LLC

(57) ABSTRACT

A speed prediction device may comprise: a selection circuit selecting a prediction section of a road for which to predict the speed of a vehicle and rear sections located behind the prediction section in a traveling direction of the vehicle; a receiving circuit receiving driving information including the speeds of vehicles passing the prediction section and the rear sections; a processing circuit generating processing information including an average speed obtained by sequentially weighting the prediction section and rear sections in order of relative distance from the prediction section and calculating an average using the weights and the driving information; and a generating circuit generating a predicted speed by inputting the processing information to a prediction model trained to predict a future speed of a vehicle.

9 Claims, 5 Drawing Sheets

Vectors, from among 288 vectors in units of five minutes, corresponding to two hours since input operation 24 vectors (2 hours)

Corresponding day 1

Day after holiday   No holiday   Special day

Day before holiday   Holiday

SPEED PREDICTION DEVICE AND METHOD THEREOF

CROSS REFERENCE TO RELATED APPLICATION

This application claims priority to Korean Patent Application No. 10-2021-0175269 filed on Dec. 9, 2021, which is hereby incorporated by reference in its entirety.

BACKGROUND

1. Field of Technology

The present disclosure relates to a speed prediction device and a method thereof.

2. Related Technology

Conventionally, a vehicle's arrival time to a destination is determined by collecting actual traffic data and predicting the arrival time directly from the collected data or by predicting the arrival time through a mathematical model or simulation. However, the method above may hardly reflect changing traffic conditions in real-time; accordingly, users who use a guide service from traffic information have to experience inconvenience.

Also, suppose road sections are assigned the same weight for estimating the speed of a vehicle driving within a specific road section. In that case, actual traffic condition is not reflected correctly for a road section in which traffic is severely congested or is moving smoothly due to a junction (JC), an interchange (IC), and an intersection of the road section belonging to the specific road section. Therefore, predicting the exact driving speed and arrival time to a destination will be difficult.

Recently, as artificial intelligence (AI) technology is getting significant attention, a lot of research is actively conducted on AI technology. We have discovered that if technology related to the artificial neural network is used out of the technologies related to AI, it is expected that the traffic condition varying in real-time may be predicted relatively accurately, and reliable information on the estimated driving speed and arrival time of a vehicle may be provided to the user.

The discussions in this section are only to provide background information and do not constitute an admission of prior art.

SUMMARY

Based on the background above, according to one aspect of the present disclosure, an object of the present disclosure is to provide a technology for predicting a future driving speed of a vehicle by selecting a prediction target section on the road and rear sections located behind the vehicle in the traveling direction of the vehicle, calculating the driving speed of the vehicle by weighting each road section differently, and training an artificial neural network using the calculated driving speed.

To achieve the object above, in one aspect of the present disclosure provides, a speed prediction device comprises: a selection circuit selecting a prediction section of a road for which to predict the speed of a vehicle and rear sections located behind the prediction section in terms of a traveling direction of the vehicle; a receiving circuit receiving driving information including the speeds of vehicles passing the prediction section and the rear sections; a processing circuit generating processing information including an average speed obtained by sequentially weighting the prediction section and rear sections in order of relative distance from the prediction section and calculating an average using the weights and the driving information; and a generating circuit generating a predicted speed by inputting the processing information to a prediction model trained to predict a future speed of a vehicle.

According to another aspect of the present disclosure, a speed prediction method comprises: selecting a prediction section of a road for which to predict the speed of a vehicle and rear sections located behind the prediction section in a traveling direction of the vehicle; receiving driving information including the speeds of vehicles passing the prediction section and the rear sections, receiving time information including one or more pieces of information on time, date, day of the week, and month at the time of driving of vehicles, and receiving section information including length and speed limit of each of the prediction section and the rear sections; and generating processing information including an average speed obtained by sequentially weighting the prediction section and rear sections in order of relative distance from the prediction section and calculating an average using the weights and the driving information. The speed prediction method further includes: generating indicator information representing degree of road congestion by calculating actual transit times of vehicles for each of the prediction section and the rear sections by dividing the lengths of the prediction section and the rear sections respectively by speed values of the vehicles included in the driving information, calculating transit time limits of the prediction section and the rear sections by dividing the lengths of the prediction section and the rear sections by the respective speed limits, and dividing the actual transit time by the transit time limit; and generating a future predicted speed by calculating the processing information, the time information, and the indicator information and inputting the calculated information into a prediction model trained to predict a future speed of a vehicle.

As described above, the present embodiment provides an advantageous effect of predicting the driving speed of a vehicle and arrival time to a destination relatively accurately by considering a specific road section and those sections located behind the specific section.

BRIEF DESCRIPTION OF THE DRAWINGS

In order that the disclosure may be well understood, there will now be described various forms thereof, given by way of example, reference being made to the accompanying drawings, in which:

FIG. 4 illustrates a case in which time information is pre-processed into a vector form according to one embodiment of the present disclosure.

The drawings described herein are for illustration purposes only and are not intended to limit the scope of the present disclosure in any way.

DETAILED DESCRIPTION OF EMBODIMENTS

Embodiments of the present disclosure are described in detail with reference to illustrative drawings. In assigning reference symbols to the constituting elements of each drawing, it should be noted that the same constituting elements are intended to have the same symbol as much as possible, even if they are shown on different drawings. Also, in describing the present disclosure, if it is determined that a detailed description of a related well-known configuration or function incorporated herein unnecessarily obscure the gist of the present disclosure, the detailed description thereof has been omitted.

Also, in describing the constituting elements of the present disclosure, terms such as first, second, A, B, (a), and (b) may be used. Such terms are intended only to distinguish one constituting element from the others and do not limit the nature, sequence, or order of the constituting element. If a constituting element is said to be "linked to," "combined with," or "connected to" a different constituting element, it should be understood that the constituting element is linked or connected to the different constituting element, but another constituting element may be "linked," "combined," or "connected" between the two constituting elements. When a component, device, element, or the like of the present disclosure is described as having a purpose or performing an operation, function, or the like, the component, device, or element should be considered herein as being "configured to" meet that purpose or to perform that operation or function.

Figure 1:
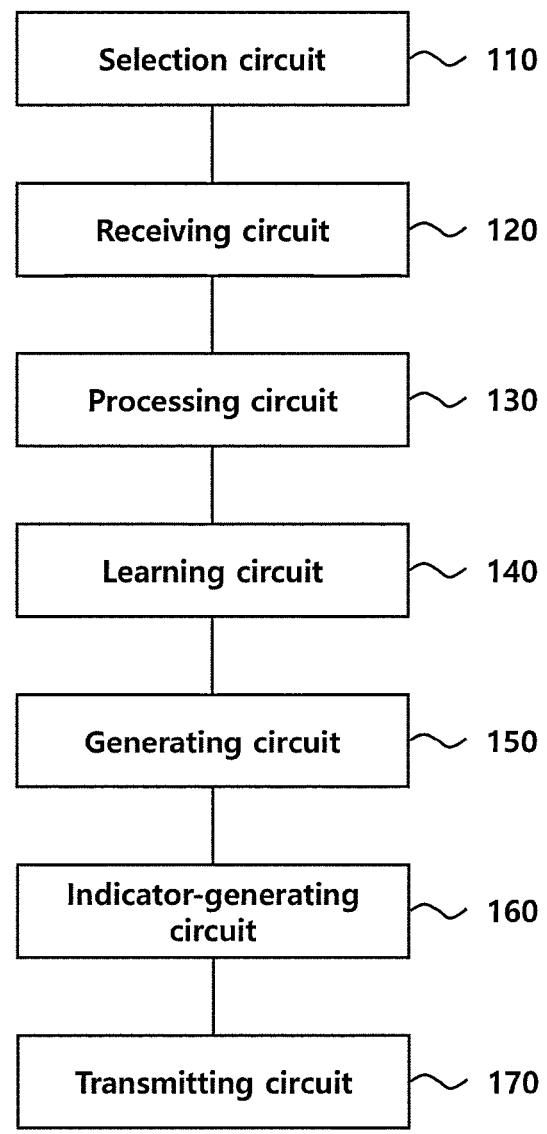
FIG. 1 schematically illustrates a speed prediction device according to one embodiment of the present disclosure.

FIG. 1 schematically illustrates a speed prediction device according to one embodiment of the present disclosure.

The speed prediction device 100 may include: a selection circuit 110, a receiving circuit 120, a processing circuit 130, a generating circuit 150, and a learning circuit 140.

Figure 3:
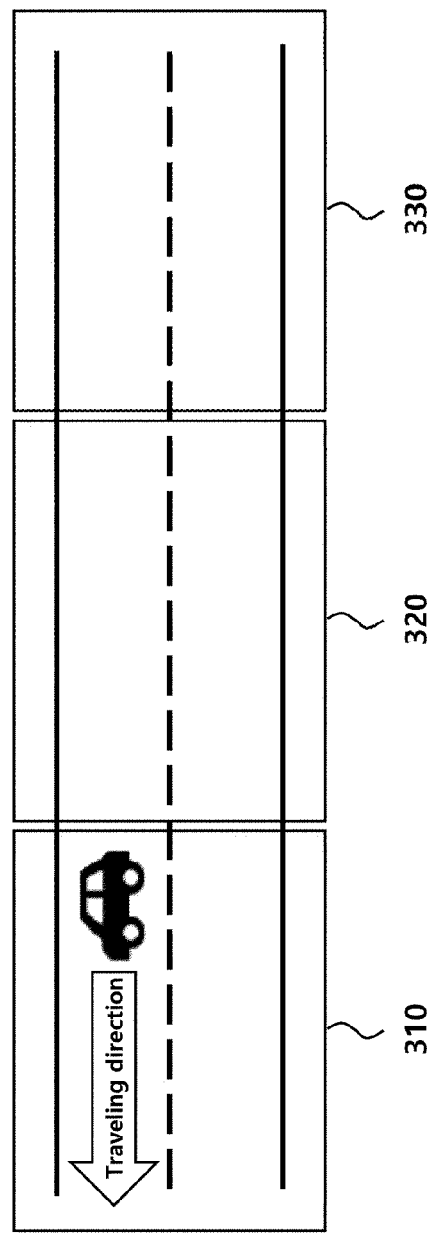
FIG. 3 is a diagram illustrating selection of a prediction section and rear sections and calculation of a weighted average of a vehicle speed according to one embodiment of the present disclosure.

The selection circuit 110 may select a prediction section of a road for which to predict the speed of a vehicle and rear sections located behind the prediction section in a traveling direction of the vehicle (See, FIG. 3). Here, the rear sections are located behind the prediction section in the traveling direction of the vehicle and may comprise one or more continuous sections.

The receiving circuit 120 may receive the driving information including the speeds of vehicles passing through the prediction section and the rear sections selected by the selection circuit 110. Also, the receiving circuit 120 may receive time information including one or more pieces of information on time, date, day of the week, and month at the time of driving of the vehicles. The receiving circuit 120 may also receive section information including the length and the speed limit of each of the prediction section and the rear sections. The receiving circuit 120 may collect each piece of information by using a probe device installed in each vehicle or by using a probe device installed on the road.

Here, the section information may be received through the receiving circuit 120 as described above, and section information on the prediction section and rear sections on the road may be stored in advance in the speed prediction device 100.

The processing circuit 130 may generate processing information including an average speed obtained by sequentially weighting the prediction section and rear sections in order of relative distance from the prediction section and calculating the average using the weights and the driving information. FIG. 3 describes in detail how to calculate the average speed using the weights.

The processing circuit 130 may also pre-process the driving information received by the receiving circuit 120 into a matrix form. Here, in the matrix including pre-processed driving information, the driving speeds of vehicles may be arranged according to the passage of time and traffic flow on the road. Also, the time information including at least one or more pieces of information on time, date, day of the week, and month at the time of driving of vehicles received by the receiving circuit 120 may be pre-processed into a vector form.

The learning circuit 140 may input the processing information into the prediction model so that the prediction model learns the processing information. Here, the prediction model may use an artificial neural network model for which a deep neural network model may be used.

The learning circuit 140 may train a prediction model by inputting the processing information including the average speeds of vehicles together with the time information, indicator information, or both the time and indicator information into the prediction model. Before being input into the prediction model, the processing information, time information, and indicator information may be calculated with each other, where the corresponding operation may be a multiplication operation. Since the prediction model learns the past speeds of vehicles in the prediction section and rear sections, time, date, day of the week, and indicators representing delays in the prediction and rear sections, the degree of delay and the vehicle speed in the prediction section may be predicted by supplying the real-time speed of a vehicle traveling on the road, current time, date, and day of the week, and a real-time delay indicator into the trained prediction model.

The speed prediction device 100 may further include an indicator-generating circuit 160.

The indicator-generating circuit 160 may generate indicator information representing the degree of road congestion by calculating actual transit times of vehicles for each of the prediction and rear sections by dividing the lengths of the prediction and rear sections respectively by speed values of the vehicles included in the driving information, calculating transit time limits of the prediction and rear sections by dividing the lengths of the prediction and rear sections by the respective speed limits, and dividing the actual transit time by the transit time limit.

The indicator information may be generated by dividing the transit time limit by the average transit time or the actual transit time or by dividing the average transit time or the actual transit time by the transit time limit.

For example, suppose the prediction section is section A, the rear section is section B, the length of section A and section B is 1000 meters, the speed limit of section A is 10 meters per second (m/s), the speed limit of section B is 20 m/s, and the speed of a vehicle passing through sections A and B is 10 m/s. Considering that the vehicles are actually traveling at 10 m/s in section B although the speed limit of section B is 20 m/s, it may be inferred that section B is relatively congested compared to section A. When the length of each section and the transit time of a vehicle for each section are used, the actual transit time for section A may be 100 seconds (s), and the transit time limit for section A may be 100 s. The actual transit time for section B may be 100 s, and the transit time limit for section B may be 50 s. Therefore, if the actual transit time is divided by the transit time limit to calculate the indicator for section A and section B, the indicator of section A may be 1, and the indicator of section B may be 2. Therefore, it may be seen that if the indicator is 1, the traffic condition of the corresponding section is smooth, and if the indicator is higher than 1, traffic in the corresponding section is delayed or congested.

Also, the indicator-generating circuit 160 may pre-process the indicator information calculated using the processing information and the section information to have a matrix form. Here, in the matrix including pre-processed indicator information, indicators representing the degree of road traffic congestion may be arranged according to the passage of time and traffic flow on the road.

The generating circuit 150 may generate the prediction speed by inputting processing information into the trained prediction model generated by the learning circuit 140. The generating circuit 150 may input the processing information together with the time information, indicator information, or both the time and indicator information into the trained prediction model. Before being input into the trained prediction model, the processing information, time information, and indicator information may be calculated with each other, where the corresponding operation may be a multiplication operation.

The vehicle speeds included in the driving information received by the receiving circuit 120 represent the vehicle speeds for the past two hours from the current time point (real-time), and the predicted speed generated by the generating circuit 150 may represent the vehicle speed up to two hours from the current time point (real-time). Here, the current time point may mean a real-time point based on which a user wants to obtain a future predicted speed through the speed prediction device.

The speed prediction device may further include a transmitting circuit 170. The transmitting circuit 170 may transmit the information on the predicted speed to a route search server that analyzes the predicted speed generated by the generating circuit 150 and generates shortest-time route information. The route search server may generate the shortest-time route information and transmit the generated information to the users navigation device, and the user may arrive at the destination with the shortest time by driving the vehicle according to the shortest-time route information.

Figure 2:
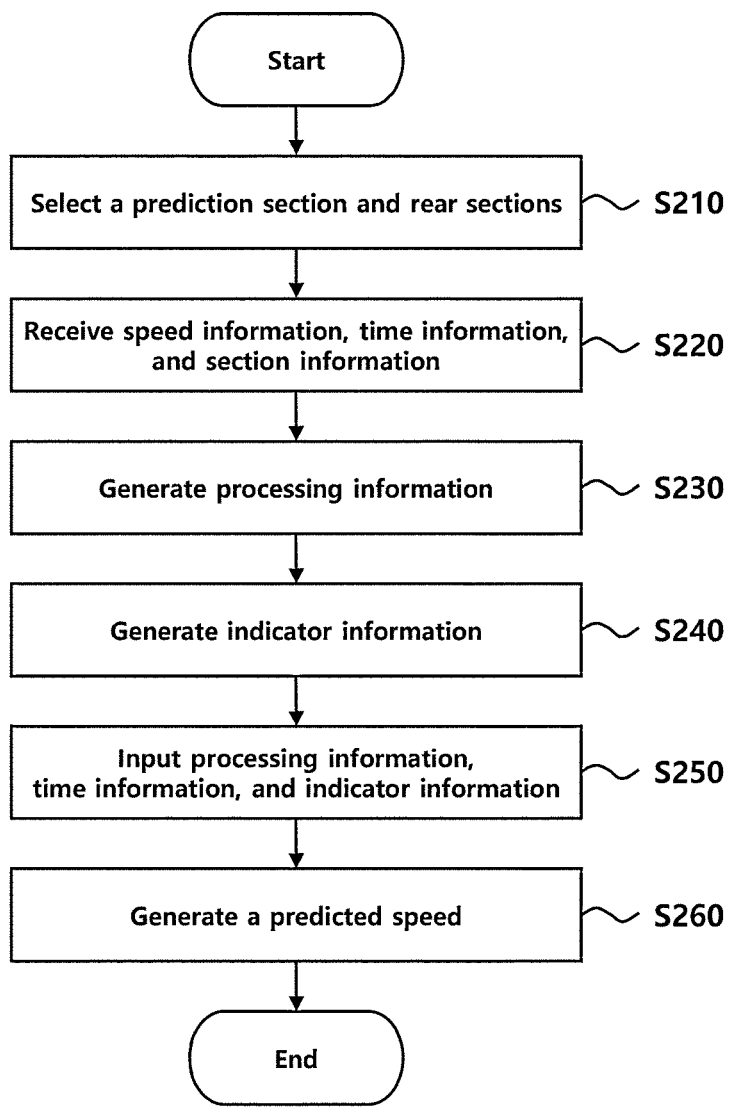
FIG. 2 is a flowchart illustrating a speed prediction method according to one embodiment of the present disclosure.

FIG. 2 is a flowchart illustrating a speed prediction method according to one embodiment of the present disclosure.

The speed prediction method may include selecting a prediction section of a road for which to predict the speed of a vehicle and rear sections located behind the prediction section in the traveling direction of the vehicle S210. Here, the rear sections are located behind the prediction section in the vehicle's traveling direction and may comprise one or more continuous sections.

The speed prediction method may further include: receiving the driving information including the speeds of vehicles passing through the prediction section and the rear sections; receiving time information including one or more pieces of information on time, date, day of the week, and month at the time of driving of the vehicles; and receiving section information including the length and the speed limit of each of the prediction section and the rear sections S220 may be performed. Each piece of information may be collected by using a probe device installed in each vehicle or by using a probe device installed on the road. The speed prediction method may further include a pre-processing step of arranging the driving information into a matrix form. In another embodiment, a pre-processing step of arranging the time information into a vector form may be further performed.

The speed prediction method may further include: generating processing information including an average speed obtained by sequentially weighting the prediction section and rear sections in order of relative distance from the prediction section and calculating the average using the weights and the driving information S230. The calculation of the average speed based on weighted averaging is described in detail with reference to FIG. 3.

In another embodiment, the speed prediction method may further include: calculating actual transit times of vehicles for each of the prediction section and the rear sections by dividing the lengths of the prediction section and the rear sections respectively by speed values of the vehicles included in the driving information; calculating transit time limits of the prediction section and the rear sections by dividing the lengths of the prediction section and the rear sections by the respective speed limits; and generating indicator information representing degree of road congestion by dividing the actual transit time by the transit time limit (S240).

The indicator information may be generated by dividing the transit time limit by actual transit time or by dividing the actual transit time by the transit time limit. The indicator information may be pre-processed to have a matrix form. Here, in the matrix including pre-processed indicator information, indicators representing the degree of road traffic congestion may be arranged according to the passage of time and traffic flow on the road.

In one embodiment, a step of calculating processing information, indicator information, and time information in real-time and inputting the calculated information into a prediction model trained to predict a vehicle speed in the future S250 may be performed. Before being input into the prediction model, the processing information, time information, and indicator information may be calculated with each other, where the corresponding operation may be a multiplication operation.

The speed prediction method may further include: generating a predicted speed in the future (S260). Here, the vehicle speeds included in the received driving information represent the vehicle speeds for the past two hours from the current time point (real-time), and the generated predicted speed may represent the vehicle speeds up to two hours from the current time point in time (real-time). Here, the current time point may mean a real-time point based on which a user wants to obtain a future predicted speed through the speed prediction device or method.

The speed prediction method may further include calculating processing information, time information, and indicator information and inputting the calculated information into a prediction model so that the prediction model learns the processing information, time information, and indicator information. The prediction model may use an artificial neural network model for which a deep neural network model may be used. The processing information, indicator information, and time information used for training the prediction model may be the information accumulated at least for the past year.

FIG. 3 is a diagram illustrating selection of a prediction section and rear sections and calculation of a weighted average of a vehicle speed according to the present disclosure.

A prediction section 310, a first rear section 320, and a second rear section 330 may be selected to predict the driving speed of a vehicle. Although a total of two rear sections are selected in FIG. 3, one rear section may be selected, or three or more rear sections may be selected.

Weights may be sequentially applied to the prediction section and the rear sections 320, 330 to calculate the average speed used to predict the driving speed of a vehicle in the prediction section 310. For example, suppose that the vehicle speed in the prediction section 310 is 30 kilometers per hour (km/h), the vehicle speed in the first rear section 320 is 40 km/h, and the vehicle speed in the second rear section 330 is 50 km/h. Then, a weight of 3 may be input to the prediction section 310, for which the driving speed is to be predicted. A weight of 2 may be input to the first rear section 320, which is relatively close to the prediction section 310; a weight of 1 may be input to the second rear section 330, which is relatively less close to the prediction section 310. Therefore, if the average speed is calculated using the vehicle speeds and weights in the respective sections 310, 320, 330, an average speed considering the weights may be calculated by adding the speed in the prediction section 310 with a weight of 3 three times, adding the speed in the first rear section 320 with a weight of 2 twice, adding the speed in the second rear section 330 with a weight of 1 once, and dividing the sum of the speeds by the sum of weights. Therefore, if the average speed is calculated according to the procedure above, the average speed is obtained as (30+30+30+40+40+50)/(3+2+1)=36.67 km/h. In other words, although the real-time driving speed of a vehicle in the prediction section 310 is 30 km/h, the average speed of the vehicle may be calculated as 36.67 km/h when the vehicle speeds in the first rear section 320 and the second rear section 330 are considered. After calculating the average speeds for a plurality of vehicles passing through the prediction section 310, the first rear section 320, and the second rear section 330 as described above, the calculated average speeds may be input to the prediction model for learning. Based on the operation above, it is possible to derive a predicted speed by considering the prediction section 310 and the rear sections 320, 330.

The above operation may be expressed as follows. Suppose there is one prediction section and n−1 rear sections, and weights of n, n−1, n−2, . . . , 1 are assigned sequentially to the prediction section and the rear sections in order of relative closeness to the prediction section. Let $v_1$, $v_2$, $v_3$, . . . , $v_n$ mean the speeds of vehicles passing through the prediction section and the rear sections in order of relative closeness to the prediction section. An equation for calculating the average speed $V_{wa}$ of a vehicle considering the weights may be expressed as follows.

$$V_{wa} = (\Sigma_{k=1}^{n} v_k \times (n+1-k))/(\Sigma_{k=1}^{n} k) \quad \text{[Equation 1]}$$

As described above, it is possible to predict the driving speed of a vehicle more accurately in the prediction section 310 through the average speeds in the prediction section and the rear sections 320, 330 and the weights thereof.

FIG. 4 illustrates a case in which time information is pre-processed into a vector form according to one embodiment of the present disclosure.

The receiving circuit installed in the speed prediction device according to one embodiment of the present disclosure may receive time information including at least one or more pieces of information on time, date, day of the week, and month at the time of driving of vehicles.

The time information may be pre-processed into a vector form, as shown in FIG. 4. The processing circuit in the speed prediction device may perform the pre-processing of the time information. The vector including the time information may include information on the time at which the vehicle travels, information on the day of the week on which the vehicle travels, information on the date at which the vehicle travels, and information on the month in which the vehicle travels, as shown in FIG. 4.

Specifically, as shown in FIG. 4, in a vector including the time information, time values corresponding to the past two hours from the current (real-time) time point at which the vehicle is traveling may have a specific value other than zero "0". Also, information on the day of the week, date, and month on which the vehicle is traveling may have a specific value other than zero "0". The value of the vector including the time information may be 1, as shown in FIG. 4 or may have a value other than 1 to assign weights to the time and date.

Therefore, a vector including the time information is calculated in association with the driving information including the driving speeds of vehicles and indicator information representing the degree of traffic congestion in the predicted section and the rear sections and used to train the prediction model to predict a driving speed of a vehicle at a specific time, date, and day of the week.

Figure 5:
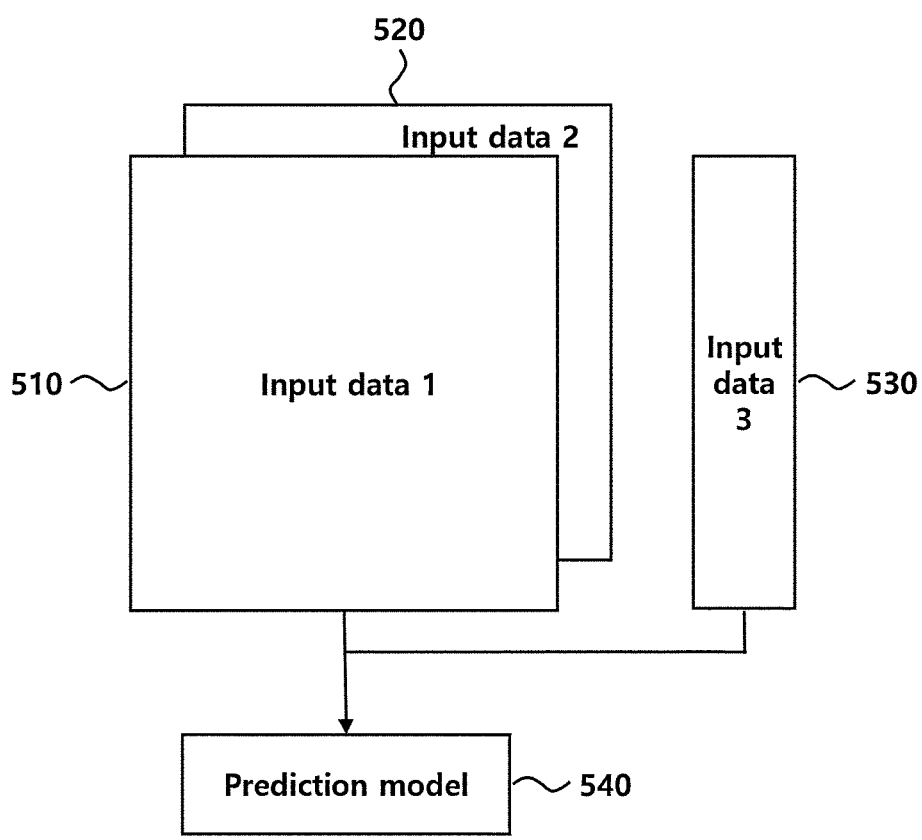
FIG. 5 is a diagram illustrating inputting processing information, time information, and indicator information to a prediction model according to one embodiment of the present disclosure.

FIG. 5 is a diagram illustrating inputting processing information, time information, and indicator information to a prediction model according to one embodiment of the present disclosure.

As shown in FIG. 5, input data 1 (510), input data 2 (520), and input data 3 (530) may be input to the prediction model 540 according to one embodiment. Here, the input data 1 (510) and the input data 2 (520) may be the processing information representing the average speeds calculated based on weighted averaging of driving speeds of vehicles received by the receiving circuit and indicator information representing the degree of traffic congestion in the prediction section and rear sections.

The indicator information may be generated by calculating actual transit times of vehicles for each of the prediction and rear sections by dividing the lengths of the prediction and rear sections respectively by speed values of the vehicles included in the driving information, calculating transit time limits of the prediction and rear sections by dividing the lengths of the prediction and rear sections by the respective speed limits, and dividing the actual transit time by the transit time limit. The indicator information may be generated by dividing the transit time limit by actual transit time or by dividing the actual transit time by the transit time limit.

The processing circuit of the speed prediction device may pre-process the processing information into a matrix form, the elements of which are arranged according to the passage of time and traffic flow on the road. The indicator-generating circuit of the speed prediction device may pre-process the indicator information into a matrix form, the elements of which are arranged according to the passage of time and traffic flow on the road.

The input data 3 (530) may be time information. The time information may include one or more pieces of information on the time, date, day of the week, and month at the time of driving of vehicles. The processing circuit of the speed prediction device may pre-process the time information into a vector form.

As shown in FIG. 5, since the processing information, indicator information, and time information are input to the prediction model 540, the driving speed of a vehicle may be predicted in the future using the average vehicle speed information including the degree of traffic congestion on the road sections and information on the time and date at the time of driving of the vehicles.

The prediction model 540 may use a deep neural network (DNN) model, and the input data 1 (510), input data 2 (520), and input data 3 (530) may be applied to a calculation process with each other before being input to the prediction model 540.

Unless otherwise explicitly stated, since the term "include, "comprise", or "have" used throughout the document means that the corresponding constituting element may be included in the embodiment, it should be interpreted that other constituting elements may be further included rather than being excluded. Unless defined otherwise, all the terms used in the present disclosure, including technical or scientific terms, provide the same meaning as understood generally by those skilled in the art to which the present disclosure belongs. Those terms defined in ordinary dictionaries should be interpreted to have the same meaning as conveyed in the context of related technology. Unless otherwise defined explicitly in the present disclosure, those terms should not be interpreted to have ideal or excessively formal meaning.

The description given above is merely an embodiment for illustrating technical principles of the present disclosure, and various changes and modifications are possible from the disclosure by those having ordinary skill in the art to which the present disclosure belongs without deviating from the inherent characteristics of the present disclosure. Therefore, it should be understood that embodiments disclosed in the present specification are not intended to limit the technical principles of the present disclosure but to support describing the present disclosure, and thus the technical scope of the present disclosure is not limited by the embodiments. The technical scope of the present disclosure should be judged by the appended claims, and all of the technical principles found within the range equivalent to the technical scope of the present disclosure should be interpreted to belong thereto.

What is claimed is:

1. A speed prediction device comprising:
   a selection circuit configured to select a prediction section of a road for which to predict a speed of a vehicle and rear sections located behind the prediction section in a traveling direction of the vehicle;
   a receiving circuit configured to receive driving information including speeds of vehicles passing the prediction section and the rear sections;
   a processing circuit configured to generate processing information including an average speed obtained by giving a higher weight on the prediction section than weights on rear sections and giving a higher weight on a rear section closer to the prediction section than a weight on a rear section farther to the prediction section and calculating an average using the weights and the driving information;
   a generating circuit configured to generate a predicted speed by inputting the processing information further including a real-time speed of the vehicle traveling on the road to a prediction model trained to predict a future speed of the vehicle;
   an indicator-generating circuit configured to generate indicator information representing a degree of road congestion for each of the prediction section and the rear sections; and
   a transmitting circuit configured to transmit information on the predicted speed to a route search server that generates shortest-time route information by analyzing the predicted speed and transmits the shortest-time route information to a navigation device for a user to drive the vehicle according to the shortest-time route information,
   wherein the generating circuit is configured to generate the predicted speed by calculating the processing information and the indicator information and inputting the calculated information into the trained prediction model, and
   wherein the prediction model is a deep neural network (DNN) model.

2. The speed prediction device of claim 1, wherein the receiving circuit is configured to receive time information including one or more pieces of information on time, date, day of a week, and month at a time of driving of vehicles, and
   the generating circuit is configured to generate the predicted speed by further calculating the time information and inputting the calculated information to the prediction model trained.

3. The speed prediction device of claim 1, further comprising: a learning circuit configured to input processing information accumulated from past into the prediction model and configured to make the prediction model learn the processing information.

4. The speed prediction device of claim 1, wherein the receiving circuit is configured to receive section information including a length and a speed limit of each of the prediction section and the rear sections.

5. The speed prediction device of claim 1, wherein the indicator-generating circuit is configured to generate the indicator information representing the degree of road congestion by calculating actual transit times of the vehicles for each of the prediction and rear sections by dividing lengths of the prediction and rear sections respectively by speed values of the vehicles included in the driving information, calculating transit time limits of the prediction and rear sections by dividing the lengths of the prediction and rear sections by the respective speed limits, and dividing the actual transit time by the transit time limit.

6. The speed prediction device of claim 1, wherein the vehicle speeds included in the driving information represent the vehicle speeds for past two hours from a current time point, and the predicted speed represents the vehicle speed up to two hours from the current time point.

7. A speed prediction method comprising:
   selecting a prediction section of a road for which to predict a speed of a vehicle and rear sections located behind the prediction section in a traveling direction of the vehicle;
   receiving driving information including speeds of vehicles passing the prediction section and the rear sections, receiving time information including one or more pieces of information on time, date, day of a week, and month at a time of driving of vehicles, and receiving section information including a length and a speed limit of each of the prediction section and the rear sections;
   generating processing information including an average speed obtained by giving a higher weight on the prediction section than weights on rear sections and giving a higher weight on a rear section closer to the prediction section than a weight on a rear section farther to the prediction section and calculating an average using the weights and the driving information;
   generating indicator information representing a degree of road congestion by calculating actual transit times of the vehicles for each of the prediction section and the rear sections by dividing the lengths of the prediction section and the rear sections respectively by speed values of the vehicles included in the driving information, calculating transit time limits of the prediction section and the rear sections by dividing the lengths of the prediction section and the rear sections by the respective speed limits, and dividing the actual transit time by the transit time limit; and generating a predicted speed by calculating the processing information, the time information, and the indicator information and inputting the calculated information including a real-time speed of the vehicle traveling on the road into a prediction model trained to predict a future speed of the vehicle; and transmitting information on the predicted speed to a route search server that generates shortest-time route information by analyzing the predicted speed and transmits the shortest-time route information to a navigation device for a user to drive the vehicle according to the shortest-time route information wherein the prediction model is a deep neural network (DNN) model.

8. The speed prediction method of claim 7, further comprising: inputting the processing information, time information, and indicator information accumulated at least for one past year to the prediction model, the prediction model configured to learn the input information.

9. The speed prediction method of claim 7, further comprising: pre-processing the time information into a vector form.

* * * * *